United States Patent
Chen et al.

(10) Patent No.: US 12,051,135 B2
(45) Date of Patent: Jul. 30, 2024

(54) SYSTEM AND METHOD FOR A PRECISE SEMANTIC SEGMENTATION

(71) Applicant: Robert Bosch GmbH, Stuttgart (DE)

(72) Inventors: Ting-Ju Chen, College Station, TX (US); Kevin H. Huang, Pittsburgh, PA (US); Ji Eun Kim, Pittsburgh, PA (US)

(73) Assignee: Robert Bosch GmbH (DE)

(*) Notice: Subject to any disclaimer, the term of this patent is extended or adjusted under 35 U.S.C. 154(b) by 378 days.

(21) Appl. No.: 17/470,501

(22) Filed: Sep. 9, 2021

(65) Prior Publication Data
US 2023/0071291 A1  Mar. 9, 2023

(51) Int. Cl.
| G06T 11/20 | (2006.01) |
| G06F 3/0485 | (2022.01) |
| G06T 11/60 | (2006.01) |
| G06V 10/26 | (2022.01) |
| G06V 30/14 | (2022.01) |

(52) U.S. Cl.
CPC .......... *G06T 11/203* (2013.01); *G06F 3/0485* (2013.01); *G06T 11/60* (2013.01); *G06V 10/26* (2022.01); *G06V 30/1456* (2022.01)

(58) Field of Classification Search
None
See application file for complete search history.

(56) References Cited

U.S. PATENT DOCUMENTS

| 10,186,062 | B2 | 1/2019 | Kim et al. |
| 10,438,357 | B2 | 10/2019 | Kim |
| 10,783,394 | B2 * | 9/2020 | Molchanov ............ G06N 3/088 |
| 2017/0032690 | A1 * | 2/2017 | Winnemoeller .......... G06T 7/13 |

FOREIGN PATENT DOCUMENTS

| CN | 110610453 A | 12/2019 |
| CN | 108898610 B | 11/2020 |
| WO | WO 0126050 A2 * | 4/2001 |

OTHER PUBLICATIONS

Sofiiuk, Konstantin, et al. "f-BRS: Rethinking Backpropagating Refinement for Interactive Segmentation." Proceedings of the IEEE/CVF Conference on Computer Vision and Pattern Recognition. 2020, 10 pages.

Zhang, Shiyin, et al. "Interactive Object Segmentation With Inside-Outside Guidance." Proceedings of the IEEE/CVF Conference on Computer Vision and Pattern Recognition. 2020, 11 pages.

(Continued)

*Primary Examiner* — Nancy Bitar
(74) *Attorney, Agent, or Firm* — Dickinson Wright PLLC (57) ABSTRACT

A computer-implement method includes receiving one or more images from one or more sensors, outputting the one or more images at a display, outputting an automatic segmentation line of the one or more portions of the image in response to an object identified in the one or more images, and in response to one or more inputs received at the system associated with a correction, outputting a correction line on the display associated with the object, wherein the correction line automatically adjust one or more vertices associated with an incorrect portion of the automatic segmentation, wherein the one or more vertices are adjusted in response to the one or more inputs.

20 Claims, 7 Drawing Sheets

(56) References Cited

OTHER PUBLICATIONS

Jang, Won-Dong, and Chang-Su Kim. "Interactive image segmentation via backpropagating refinement scheme." Proceedings of the IEEE Conference on Computer Vision and Pattern Recognition. 2019, 10 pages.

Maninis, Kevis-Kokitsi, et al. "Deep extreme cut: From extreme points to object segmentation." Proceedings of the IEEE Conference on Computer Vision and Pattern Recognition. 2018, 10 pages.

* cited by examiner

SYSTEM AND METHOD FOR A PRECISE SEMANTIC SEGMENTATION

TECHNICAL FIELD

The present disclosure relates to image processing, including semantic segmentation.

BACKGROUND

While manual semantic segmentation done by human labelers is a time-consuming and labor-intensive process, researchers have attempted to expedite such a process using artificial intelligence driven semantic segmentation methods. Those AI driven methods are often imprecise. Furthermore, AI methods may return image masks which are unsuitable for a user to use in making precise manual corrections.

SUMMARY

According to a first embodiment, a system includes memory, a display, and a processor coupled to the memory and the display. The processor is programmed to receive one or more images, output the one or more images at a display, output one or more vertices associated with an automatic segmentation of the one or more portions of the image, and in response to one or more inputs received at the system associated with a correction, output a correction line on the display associated with the image, wherein the correction line automatically adjust the one or more vertices associated with an incorrect portion of the automatic segmentation, wherein the one or more vertices are adjusted in response to the one or more inputs.

According to a second embodiment, a computer-implement method includes receiving one or more images from one or more sensors, outputting the one or more images at a display, outputting an automatic segmentation line of the one or more portions of the image in response to an object identified in the one or more images, and in response to one or more inputs received at the system associated with a correction, outputting a correction line on the display associated with the object, wherein the correction line automatically adjust one or more vertices associated with an incorrect portion of the automatic segmentation, wherein the one or more vertices are adjusted in response to the one or more inputs.

According to a third embodiment, a system includes a processor coupled to the system. The processor is programmed to receive one or more images, output the one or more images, output an automatic segmentation line of one or more portions of the image in response to an object identified in the one or more images, and in response to one or more inputs received at the system from a user, wherein the inputs are associated with a correction of the automatic segmentation line, outputting a correction line, wherein the correction line automatically adjusts one or more vertices associated with an incorrect portion of the automatic segmentation, wherein the one or more vertices are adjusted in response to the one or more inputs.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The method described below may include multiple different phases. In on embodiment, the system may include three phases. A first phase may be an initial interactive segmentation phase. A human annotator may provide a proper input to indicate a target object in an image. For example, the annotator may click the center of an object in the image to indicate foreground object only, or indicate positive (foreground) and negative (background) areas with clicks or scribbles depending on the underlying machine learning models used in a system. An off-shelf machine learning model may be integrated to the system by retaining it with different datasets. A machine learning model generate an interaction map upon user's clicks or scribbles, create a coarse grained segmentation in the network, and refine segmentation through backpropagation or a refinement network to finally generate a segmentation mask.

Another phase may be the polygon-conversion phase. In such a phase, the system may generate a dense-vertex closed polygon for the contour from the segmentation mask and overlays the polygon on the image for the user to correct at a pixel-precise level.

A third phase may include a user-correct phase. In such a phase, an annotator may use novel interactions to quickly make precise, multi-vertex corrections to the polygon. Because polygons may be generated from a mask may have a high vertex count when precisely preserving the mask contour, it may be extremely time-consuming for a user to correct the vertices one by one when inaccuracies occur. Interactions may be created to address such a problem. The interactions may include a draw-and-replace algorithm and a slide-and-delete algorithm. The slide-and-delete algorithm may allow a user to easily create straight lines (e.g., the top of car) from jagged boundaries. The user may simply select a vertex from the side and it may slide it across to the other side to eliminate vertices along the way, which may end with a straight line. Each vertex may have two paths/lines to connect adjacent vertices in the polygon. The system may calculate the distance of all vertices in each path and delete vertices belonging to the path which has a shorter distance.

Figure 1:
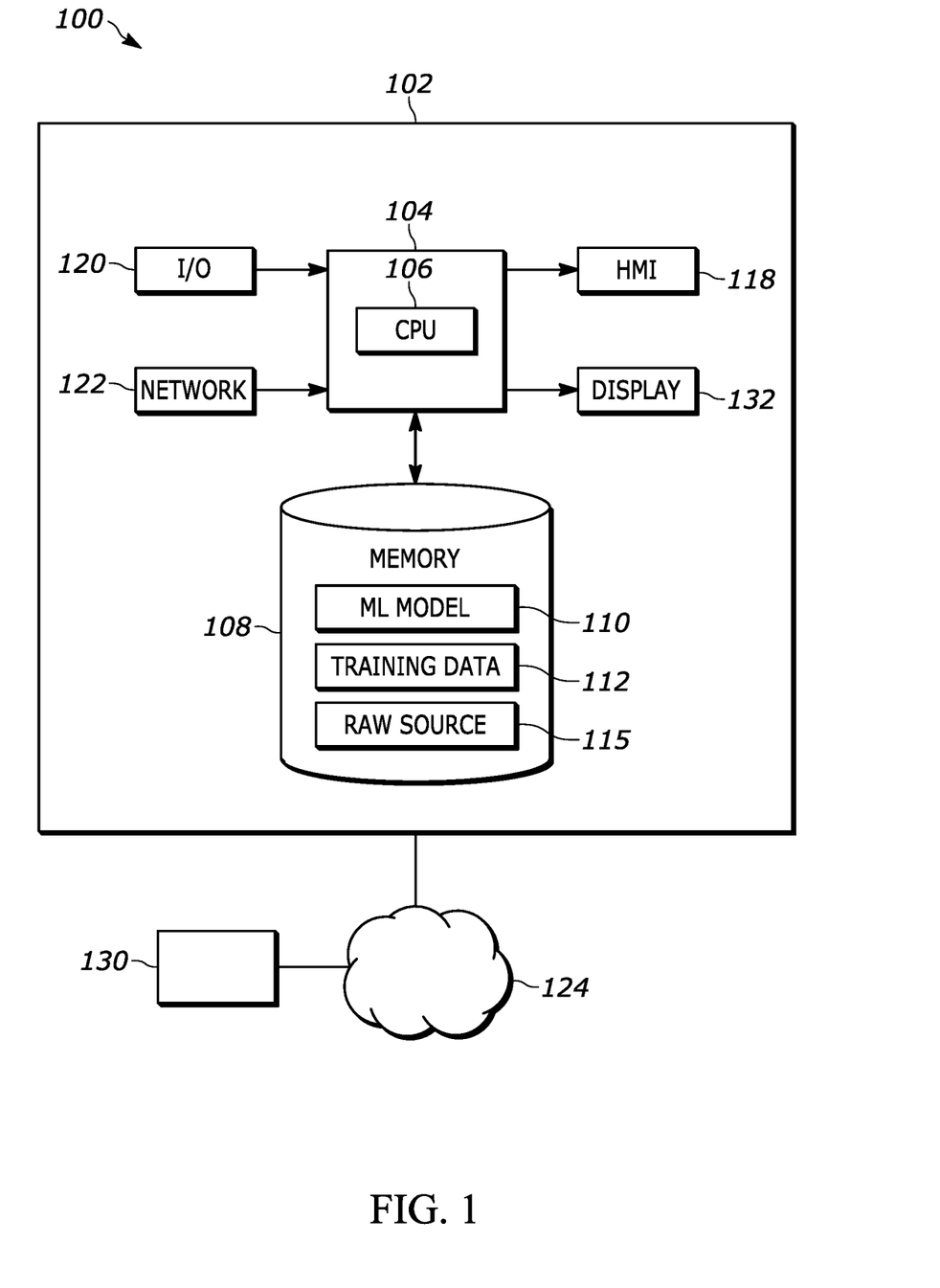
FIG. 1 depicts a data annotation system 100 to implement a system. The data annotation system 100 may include at least one computing system 102.

FIG. 1 depicts a data annotation system 100 to implement a system. The data annotation system 100 may include at least one computing system 102. The computing system 102 may include at least one processor 104 that is operatively connected to a memory unit 108. The processor 104 may include one or more integrated circuits that implement the functionality of a central processing unit (CPU) 106. The CPU 106 may be a commercially available processing unit that implements an instruction stet such as one of the x86, ARM, Power, or MIPS instruction set families. During operation, the CPU 106 may execute stored program instructions that are retrieved from the memory unit 108. The stored program instructions may include software that controls operation of the CPU 106 to perform the operation described herein. In some examples, the processor 104 may be a system on a chip (SoC) that integrates functionality of the CPU 106, the memory unit 108, a network interface, and input/output interfaces into a single integrated device. The computing system 102 may implement an operating system for managing various aspects of the operation.

The memory unit 108 may include volatile memory and non-volatile memory for storing instructions and data. The non-volatile memory may include solid-state memories, such as NAND flash memory, magnetic and optical storage media, or any other suitable data storage device that retains data when the computing system 102 is deactivated or loses electrical power. The volatile memory may include static and dynamic random-access memory (RAM) that stores program instructions and data. For example, the memory unit 108 may store a machine-learning model 110 or algorithm, a training dataset 112 for the machine-learning model 110, raw source dataset 115.

The computing system 102 may include a network interface device 122 that is configured to provide communication with external systems and devices. For example, the network interface device 122 may include a wired and/or wireless Ethernet interface as defined by Institute of Electrical and Electronics Engineers (IEEE) 802.11 family of standards. The network interface device 122 may include a cellular communication interface for communicating with a cellular network (e.g., 3G, 4G, 5G). The network interface device 122 may be further configured to provide a communication interface to an external network 124 or cloud.

The external network 124 may be referred to as the world-wide web or the Internet. The external network 124 may establish a standard communication protocol between computing devices. The external network 124 may allow information and data to be easily exchanged between computing devices and networks. One or more servers 130 may be in communication with the external network 124.

The computing system 102 may include an input/output (I/O) interface 120 that may be configured to provide digital and/or analog inputs and outputs. The I/O interface 120 may include additional serial interfaces for communicating with external devices (e.g., Universal Serial Bus (USB) interface).

The computing system 102 may include a human-machine interface (HMI) device 118 that may include any device that enables the system 100 to receive control input. Examples of input devices may include human interface inputs such as keyboards, mice, touchscreens, voice input devices, and other similar devices. The computing system 102 may include a display device 132. The computing system 102 may include hardware and software for outputting graphics and text information to the display device 132. The display device 132 may include an electronic display screen, projector, printer or other suitable device for displaying information to a user or operator. The computing system 102 may be further configured to allow interaction with remote HMI and remote display devices via the network interface device 122.

The system 100 may be implemented using one or multiple computing systems. While the example depicts a single computing system 102 that implements all of the described features, it is intended that various features and functions may be separated and implemented by multiple computing units in communication with one another. The particular system architecture selected may depend on a variety of factors.

The system 100 may implement a machine-learning algorithm 110 that is configured to analyze the raw source dataset 115. The raw source dataset 115 may include raw or unprocessed sensor data that may be representative of an input dataset for a machine-learning system. The raw source dataset 115 may include video, video segments, images, text-based information, and raw or partially processed sensor data (e.g., radar map of objects). In some examples, the machine-learning algorithm 110 may be a neural network algorithm that is designed to perform a predetermined function. For example, the neural network algorithm may be configured in automotive applications to identify pedestrians in video images.

The computer system 100 may store a training dataset 112 for the machine-learning algorithm 110. The training dataset 112 may represent a set of previously constructed data for training the machine-learning algorithm 110. The training dataset 112 may be used by the machine-learning algorithm 110 to learn weighting factors associated with a neural network algorithm. The training dataset 112 may include a set of source data that has corresponding outcomes or results that the machine-learning algorithm 110 tries to duplicate via the learning process. In this example, the training dataset 112 may include source videos with and without pedestrians and corresponding presence and location information. The source videos may include various scenarios in which pedestrians are identified.

The machine-learning algorithm 110 may be operated in a learning mode using the training dataset 112 as input. The machine-learning algorithm 110 may be executed over a number of iterations using the data from the training dataset 112. With each iteration, the machine-learning algorithm 110 may update internal weighting factors based on the achieved results. For example, the machine-learning algorithm 110 can compare output results (e.g., annotations, latent variables, adversarial noise, etc) with those included in the training dataset 112. Since the training dataset 112 includes the expected results, the machine-learning algorithm 110 can determine when performance is acceptable. After the machine-learning algorithm 110 achieves a predetermined performance level (e.g., 100% agreement with the outcomes associated with the training dataset 112), the machine-learning algorithm 110 may be executed using data that is not in the training dataset 112. The trained machine-learning algorithm 110 may be applied to new datasets to generate annotated data.

The machine-learning algorithm 110 may be configured to identify a particular feature in the raw source data 115. The raw source data 115 may include a plurality of instances or input dataset for which annotation results are desired. For example, the machine-learning algorithm 110 may be configured to identify the presence of a pedestrian in video images and annotate the occurrences. The machine-learning algorithm 110 may be programmed to process the raw source data 115 to identify the presence of the particular features. The machine-learning algorithm 110 may be configured to identify a feature in the raw source data 115 as a predetermined feature (e.g., pedestrian). The raw source data 115 may be derived from a variety of sources. For example, the raw source data 115 may be actual input data collected by a machine-learning system. The raw source data 115 may be machine generated for testing the system. As an example, the raw source data 115 may include raw video images from a camera.

In the example, the machine-learning algorithm 110 may process raw source data 115 and output an indication of a representation of an image. The output may also include augmented representation of the image. A machine-learning algorithm 110 may generate a confidence level or factor for each output generated. For example, a confidence value that exceeds a predetermined high-confidence threshold may indicate that the machine-learning algorithm 110 is confident that the identified feature corresponds to the particular feature. A confidence value that is less than a low-confidence threshold may indicate that the machine-learning algorithm 110 has some uncertainty that the particular feature is present.

Figure 2:
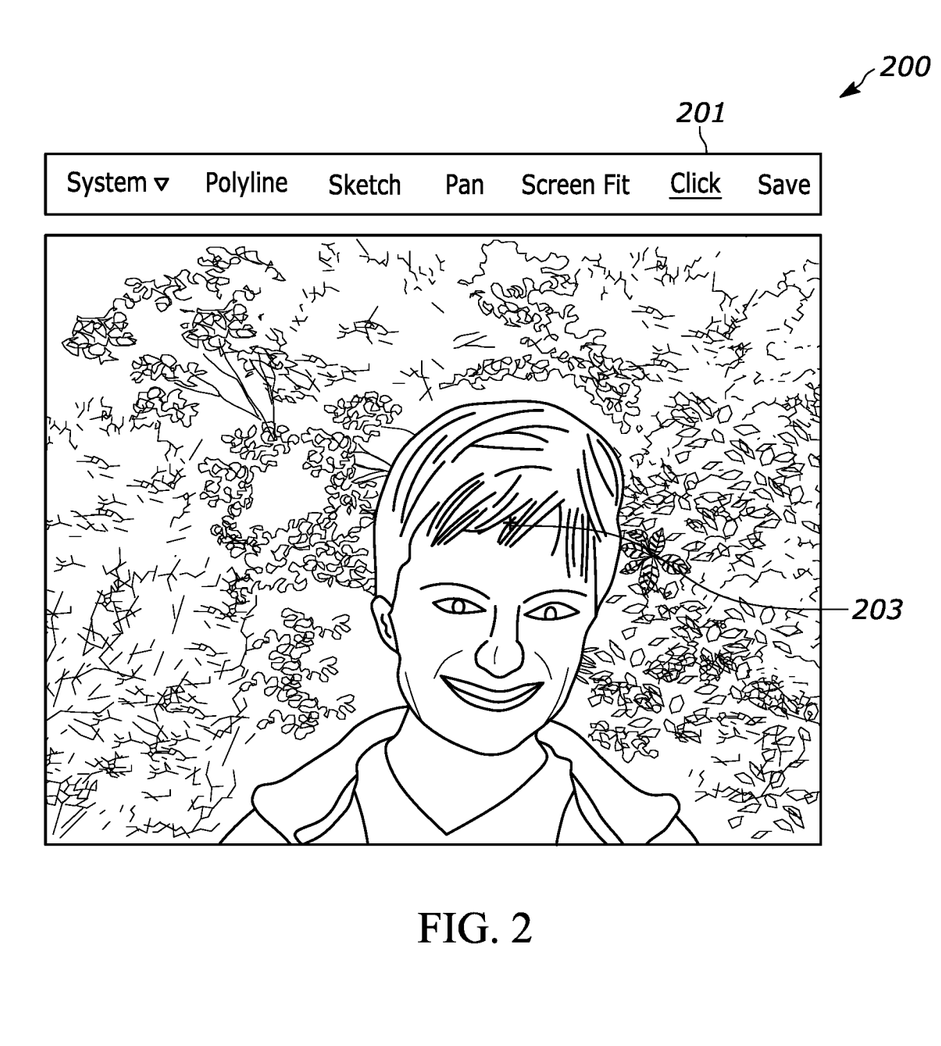
FIG. 2 discloses an example user interface.

FIG. 2 discloses an example user interface. In such an interface 200, the system may output an image on a display. The interface 200 may include a menu 201 located in a top portion of the screen. The menu 201 may include options related to a polyline, sketch, pan, screen fit, click, and saving. In one example, the image may include a picture of a person with other objects in the background. In one example, the system may output a cursor 203 to select and edit various characteristics of the image. The system may takes an input image and transforms the input image to produce an output, such as that shown. The input image may be of two or higher dimensions and may be a depth image, a color image, a medical volume, a silhouette image or other type of digital image. A silhouette image may be a binary image where image elements take either a 0 (background) or 1 (foreground) value. In some examples the input image may be one of a sequence of images received over time such as a video image, depth image stream or other image sequence. The trained image processing system may be produced by a machine learning system operating on a huge number of training image pairs and optionally other information. The machine learning system may be any computer-implemented process for learning one or more parameters of a function for transforming an image.

Figure 3:
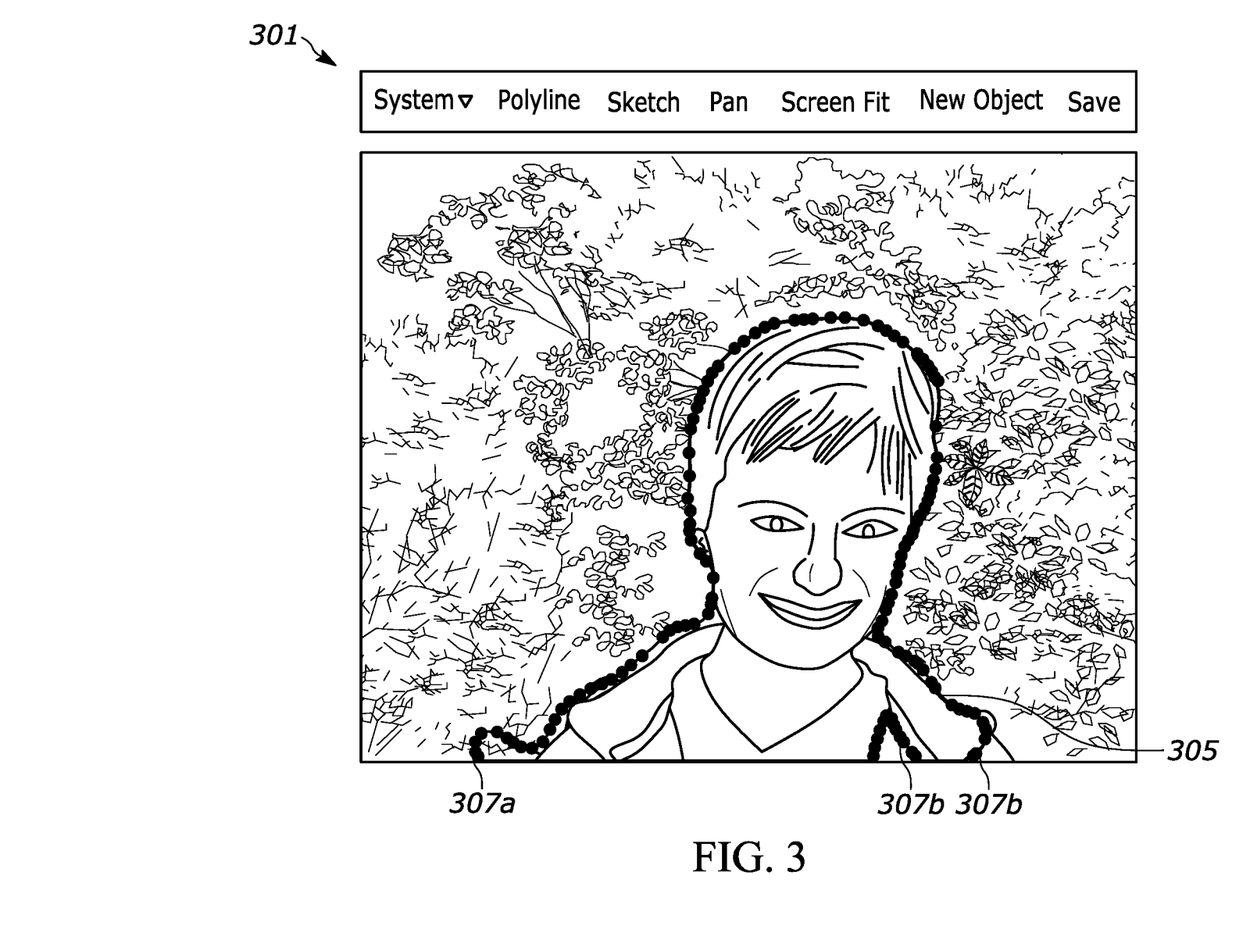
FIG. 3 discloses an example of a user interface conducting an automatic segmentation.

FIG. 3 discloses an example of a user interface conducting an automatic segmentation. The image may, for example, attempt to segment the person from the image, while avoiding capturing the background portion of the image. As shown in FIG. 3, an outline 305 is selected. At 307a, the segmentation may have been done incorrectly and select a portion of the background of the image that is distinct form the person, such as trees or other plants. Thus, the incorrect portion 307a may be too inclusive of all the pixels associated with the object and select pixels associated with the background. At 307b, the segmentation may have been produced incorrectly and select a portion of the person that is not correctly outlining the shape of a collar or jacket. Thus, the incorrect portion 307b may be too exclusive of all the pixels associated with the object.

Figure 4:
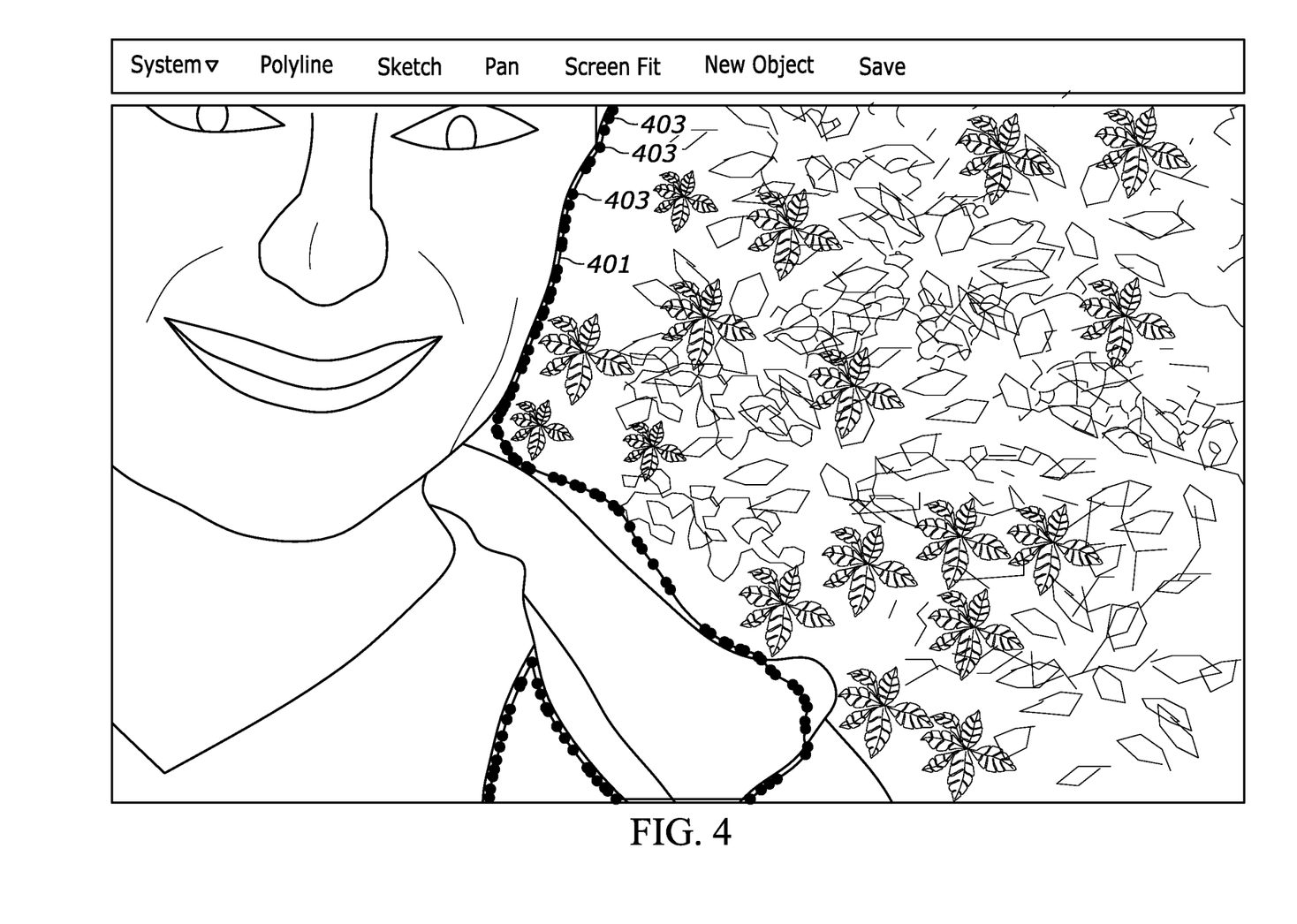
FIG. 4 discloses a zoomed in example of a user interface conducting an automatic segmentation.

FIG. 4 discloses a zoomed in example of a user interface conducting an automatic segmentation. As shown, the contour around the cheek and collar of the user is not accurate. Thus, correction is need. However, correcting each vertex may be a slow and laborious task as there are so man vertices to move. As shown, one or more of the vertices may be off and picking up items in the background or incorrectly aligning clothing of a user.

Figure 5:
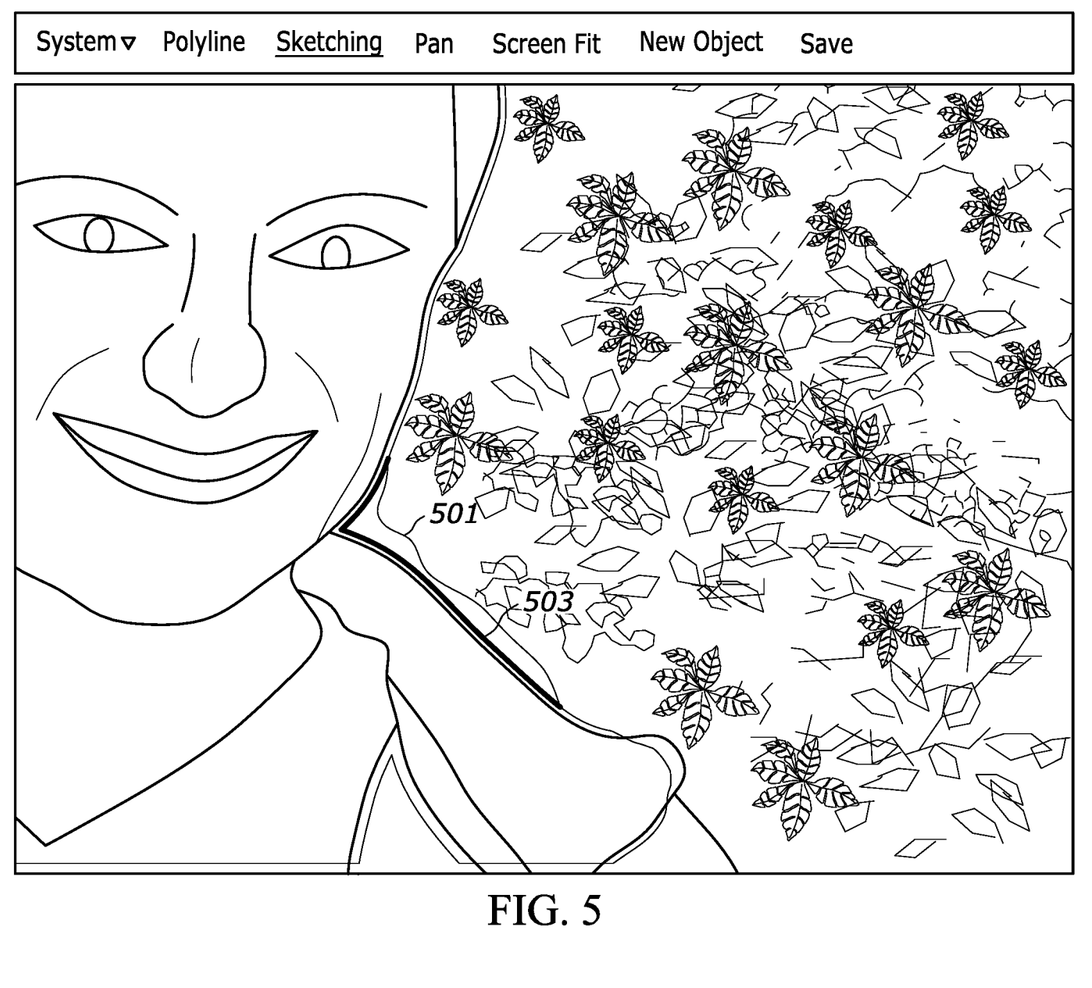
FIG. 5 discloses a zoomed example of a draw-and-replace interaction.

FIG. 5 discloses a zoomed example of a draw-and-replace interaction. In such an embodiment, the user may draw a correction line 503 in the areas where the original line 501 was incorrect. The system may automatically replace the faulty contour of the original line 501 in the area that the correction line 503 may overlap with the original line 501. For example, in the illustration of FIG. 5, the area of the original line 501 near the neck and the collar of the image may be replaced with the correction line 503. The correction line 503 may be created via an input of a user, such as a mouse or other user device tracing, stylus or similar type of smart-pen, finger drag, or any type of user input.

Utilizing the draw-and-replace method, the user may need to only draw a correction line near an inaccurate section of the polygon. Then, the system may automatically determine how to correct the faulty section according to a new line, which may be the final output line. For example, if the new line is outside of the existing polygon, the polygon may grow to attach to the new line while replacing the faulty section. If the new line is inside the polygon, the polygon will shrink to remove the faulty section and attach to the new line. This is shown, for example, in FIGS. 3-6.

The draw-and-replace algorithm may utilize several parameters to account for user-intention to correctly modify the polygon according to the correction line. As a first step, the system may create a PATH. The PATH may be the initial closed polygon path generated from the segmentation mask: $[v_s, \ldots, v_e]$ where $v_s$ is the start vertex and $v_e$ is the end vertex.

The correction line may be $[v_1, \ldots, v_m, \ldots, v_2]$ where $v_1$ is the starting point of the correction line, $v_m$ is the mid point, and $v_2$ is the end point. The system may then find the vertices on the PATH that has the shortest distance to $v_1$ and $v_2$. Those shortest distance may be denoted as $v_1'$ and $v_2'$. The system may then retrieve and get the portion of the PATH that runs from $v_1'$ to $v_2'$ clockwise and denote that as CANDIDATE A (e.g., a first candidate). The system may retrieve the portion of the path that runs from $v_1'$ to $v_2'$ counterclockwise and denote that as CANDIDATE B. The system may then calculate the difference between the length of the correction line and the length of each candidate. To the candidate with the smaller absolute difference, the system may then assign it one point.

The system may determine and calculate the difference between the area of the correction line and the area of each candidate. The area may be calculated by joining the start and end points of each line and utilizing a polygon approximation algorithm. To the candidate with the smaller absolute difference, the system may assign it one point. The system may then find the vertex on the PATH that has the shortest distance to $v_m$; and let it be denoted as $v_m'$. To the candidate that contains $v_m'$, the system may assign it one point. The system may then assign the candidate with the most points to be the one to be replaced with the correction line. The system may then finally replace that candidate with the correction line to form the new polygon and output it to the display or user interface.

Figure 6:
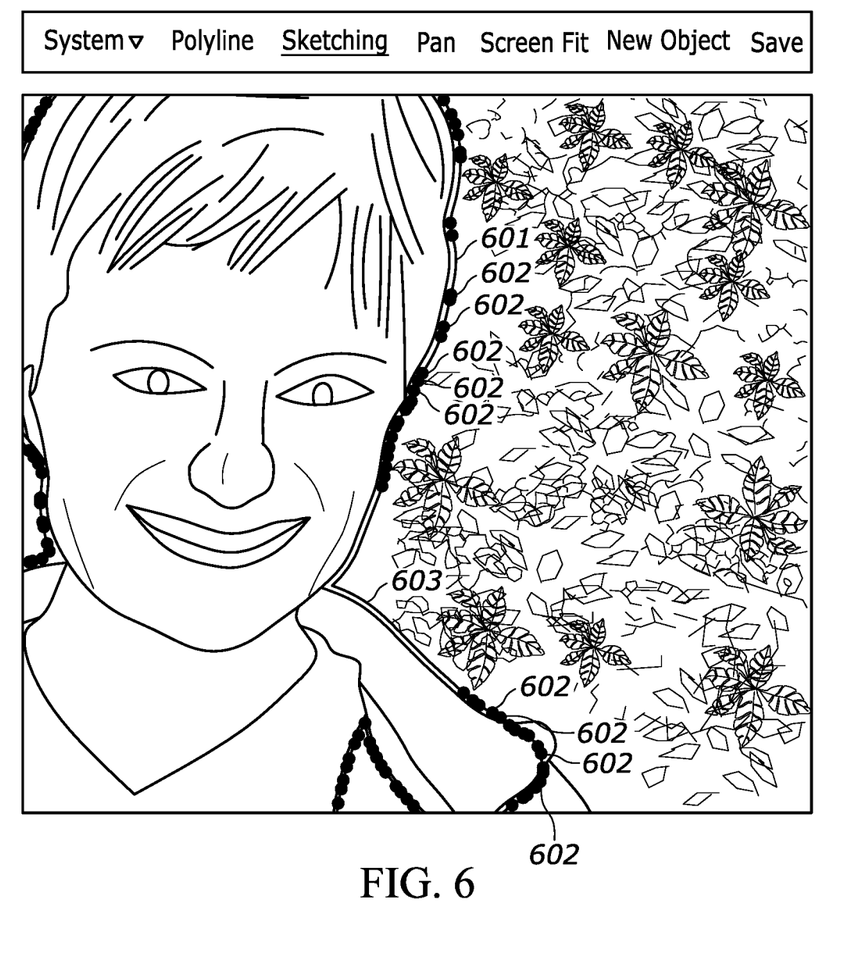
FIG. 6 illustrates an example of a system replacing the original line with the correction line.

FIG. 6 illustrates an example of a system replacing the original line with the correction line. The system may automatically utilize an automatic segmentation algorithm or module to draw various lines around an object, face, or other portion of the image. The original line 601 may be associated with a boundary line of a human in one example, such as the one shown in FIG. 6. Thus, the system may aim to identify all the pixels in an image associated with a person and not other portions or objects in the image. The system may then create a line 601 utilizing the automatic segmentation based on the pixels identifying a boundary of the object or other area. Portions of the original line 601 may not correctly identify all the correct pixels, and thus the original line 601 may include an incorrect portion 602. The incorrect portion 602 may be pixels that are associated with an incorrect object rather than a boundary of the object. For example, the color of a person may be identified rather than the outline of the person (e.g., too small of an area), or a background image may be identified. The user may identify a correction line 603 to draw. The correction line 603 may be drawn utilizing a touch screen or mouse. In the example below, the correction line 603 may be utilized to further define a jaw of the person in the image or correctly define the collar of the person in the image.

Figure 7:
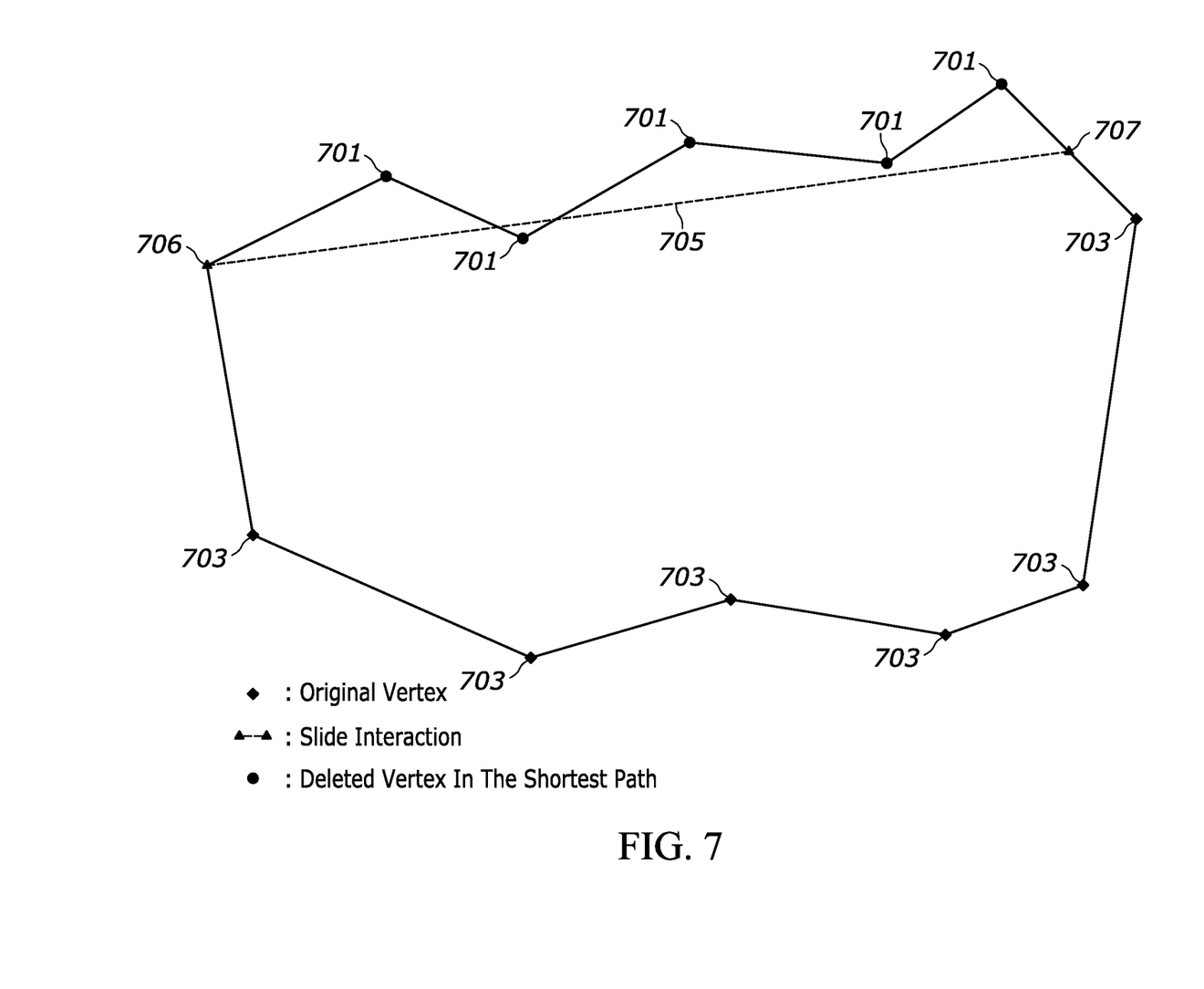
FIG. 7 illustrates an embodiment of various vertices for a slide and delete embodiment.

FIG. 7 illustrates an embodiment of various vertices for a slide and delete embodiment. The output may include an original vertex 703, a slide interaction 705, and a delete vertex 701. The original vertex 703 may be automatically compiled by the system but have errors with respect to the segmentation. In one embodiment, a user may identify a first point 706 indicated by a first input via a user interface (e.g., mouse, touch screen, haptic device, etc.). The user may "drag" or continue a click (e.g., not release a press or finger drag). The drag may remove or delete vertices in the path with the shortest distance between the new vertices. Thus, the drag may include a start point and an end point for new vertices. All the vertices that are deleted are those with the shortest path from the new vertices. Thus, the new vertices associated with the drag will replace the old vertices.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system comprising:
a memory;
a display; and
a processor coupled to the memory and the display, the processor programmed to:
receive an image that includes one or more portions;
output the image at a display;
output one or more vertices associated with an automatic segmentation of the one or more portions of the image; and
in response to one or more inputs received at the system associated with a correction, output a correction line on the display associated with the image, wherein the correction line automatically adjusts the one or more vertices associated with an incorrect portion of the automatic segmentation, wherein the one or more vertices are adjusted in response to the one or more inputs and the correction line automatically adjusts by finding a first vertex on a path generated from a segmentation mask with a start vertex and an end vertex, and outputs a first candidate vertex based on a shortest distance to a mid-point vertex between the start vertex and the end vertex and a second candidate vertex based on a counterclockwise path from the start vertex and the end vertex, and selects and assigns either the first candidate vertex or second candidate vertex based on at least a polygon approximation algorithm.

2. The system of claim 1, wherein the automatic segmentation is associated with facial recognition or objection detection.

3. The system of claim 1, wherein the one or more vertices associated with the incorrect portion are in response to a start point and end point of a correction line.

4. The system of claim 1, wherein in response to one or more inputs receive at the system associated with a deletion, deleting one or more vertices associated with an incorrect portion of the automatic segmentation.

5. The system of claim 4, wherein in response to one or more inputs received at the system associated with a deletion includes a drag of a user interface or finger.

6. The system of claim 1, wherein in response to one or more inputs received at the system associated with a correction includes a first input associated with a start and a second input associated with an end.

7. The system of claim 1, wherein the processor is further programmed to identify a shortest distance between a start point and end point of the correction line.

8. The system of claim 1, wherein the processor is further programmed to identify and remove old vertices associated with the original line in response to the correction line.

9. A computer-implement method comprising:
receiving one or more images from one or more sensors;
outputting the one or more images at a display;
outputting an automatic segmentation line of the one or more portions of the image in response to an object identified in the one or more images; and
in response to one or more inputs received that are associated with a correction, outputting a correction line on the display associated with the object, wherein the correction line automatically adjust one or more vertices associated with an incorrect portion of the automatic segmentation, wherein the one or more vertices are adjusted in response to the one or more inputs, and the correction line automatically adjusts by finding a first vertex on a path generated from a segmentation mask with a start vertex and an end vertex, and outputs a first candidate vertex based on a shortest distance to a mid-point vertex between the start vertex and the end vertex and a second candidate vertex based on a counterclockwise path from the start vertex and the end vertex, and selects and assigns either the first candidate vertex or second candidate vertex based on at least a polygon approximation algorithm.

10. The computer-implemented method of claim 9, wherein the method includes outputting one or more vertices at the automatic segmentation line.

11. The computer-implemented method of claim 9, wherein the automatic segmentation is associated with facial recognition or objection detection.

12. The computer-implemented method of claim 9, wherein the one or more vertices associated with the incorrect portion are in response to a start point and end point of a correction line.

13. The computer-implemented method of claim 9, wherein in response to one or more inputs received that are associated with a correction includes a first input associated with a start and a second input associated with an end.

14. The computer-implemented method of claim 13, wherein the method includes removing one or more vertices associated with a drag line that includes a start point and an end point.

15. The computer-implemented method of claim 14, wherein removing the one or more vertices associated with the drag line in response to a shortest distance between one or more vertices associated with the drag line and one or more vertices associated with the automatic segmentation line.

16. A system, comprising:
   a processor coupled to the system, wherein the processor is programmed to:
      receive one or more images;
      output the one or more images;
      output an automatic segmentation line of one or more portions of the image in response to an object identified in the one or more images; and
      in response to one or more inputs received at the system from a user, wherein the inputs are associated with a correction of the automatic segmentation line, outputting a correction line, wherein the correction line automatically adjusts one or more vertices associated with an incorrect portion of the automatic segmentation, wherein the one or more vertices are adjusted in response to the one or more inputs and the correction line automatically adjusts by finding a first vertex on a path generated from a segmentation mask with a start vertex and an end vertex, and outputs a first candidate vertex based on a shortest distance to a mid-point vertex between the start vertex and the end vertex and a second candidate vertex based on a counterclockwise path from the start vertex and the end vertex, and selects and assigns either the first candidate vertex or second candidate vertex based on at least a polygon approximation algorithm.

17. The system of claim 16, wherein the object is identified utilizing facial recognition or objection recognition.

18. The system of claim 16, wherein the processor is further programmed to remove a portion of the automatic segmentation line in response to the correction line.

19. The system of claim 18, wherein the portion of the automatic segmentation that is removed is in response to identifying a shortest distance between the one or more vertices associated with the incorrect portion of the automatic segmentation and one or more vertices associated with the correction line.

20. The system of claim 16, wherein the processor is programmed to remove one or more vertices associated with a drag line that includes a start point and an end point.

* * * * *